(12) United States Patent
Aguilar, Jr. et al.

(10) Patent No.: US 7,318,218 B2
(45) Date of Patent: Jan. 8, 2008

(54) SYSTEM AND METHOD FOR PROCESSOR THREAD FOR SOFTWARE DEBUGGING

(75) Inventors: Maximino Aguilar, Jr., Austin, TX (US); Sidney James Manning, Austin, TX (US); Mark Richard Nutter, Austin, TX (US); James Michael Stafford, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 10/670,834

(22) Filed: Sep. 25, 2003

(65) Prior Publication Data

US 2005/0071814 A1    Mar. 31, 2005

(51) Int. Cl.
G06F 9/45 (2006.01)
(52) U.S. Cl. .................................................. 717/124
(58) Field of Classification Search ................ 717/124
See application file for complete search history.

(56) References Cited

U.S. PATENT DOCUMENTS

| | | | |
|---|---|---|---|
| 4,394,727 A | 7/1983 | Hoffman et al. | 718/103 |
| 4,787,057 A | 11/1988 | Hammond | 708/607 |
| 4,862,354 A | 8/1989 | Fiacconi et al. | 709/216 |
| 5,185,861 A | 2/1993 | Valencia | 711/120 |
| 5,490,278 A | 2/1996 | Mochizuki | 708/446 |
| 5,548,798 A | 8/1996 | King | 710/68 |
| 5,560,030 A | 9/1996 | Guttag et al. | 712/16 |
| 5,689,722 A | 11/1997 | Swarztrauber | 712/12 |
| 5,692,193 A | 11/1997 | Jagannathan et al. | 718/106 |
| 5,754,817 A | 5/1998 | Wells et al. | 711/203 |
| 5,887,186 A | 3/1999 | Nakanishi | 712/28 |
| 5,978,831 A | 11/1999 | Ahamed et al. | 718/105 |
| 6,128,724 A | 10/2000 | Lee et al. | 712/32 |
| 6,292,935 B1 | 9/2001 | Lueh et al. | 717/148 |
| 6,381,659 B2 | 4/2002 | Proch et al. | 710/57 |
| 6,463,521 B1 | 10/2002 | Long | 712/213 |

(Continued)

FOREIGN PATENT DOCUMENTS

JP     05-242057     9/1993

(Continued)

OTHER PUBLICATIONS

"Error correction coding" "Backup" Microsoft Corp. (fifth edition). © 2002. Microsoft Press.

(Continued)

Primary Examiner—John Chavis
(74) Attorney, Agent, or Firm—VanLeeuwen & VanLeeuwen; D'Ann N. Rifai

(57) ABSTRACT

A system and method for using a processor thread as a debugger is presented. A computer system boots up and initiates a debugger thread. The debugger thread loads a robust, debugger operating system and executes the debugger operating system. Once the debugger thread is functioning, the debugger thread invokes an operational thread. In turn, the operational thread loads a primary operating system and may run various applications. While the operational thread executes the primary operating system and the applications, the debugger thread monitors the operational thread for proper functionality. When the operational thread crashes or terminates, the debugger thread retrieves operational data from the operational thread and provides the operational data to a software developer for analysis.

20 Claims, 8 Drawing Sheets

U.S. PATENT DOCUMENTS

| | | | |
|---|---|---|---|
| 6,473,897 B1 | 10/2002 | Ansari et al. | 717/136 |
| 6,480,818 B1* | 11/2002 | Alverson et al. | 703/26 |
| 6,526,491 B2 | 2/2003 | Suzuoki et al. | 711/164 |
| 6,559,854 B2 | 5/2003 | Oka et al. | 345/619 |
| 6,704,926 B1 | 3/2004 | Blandy et al. | 717/148 |
| 6,966,015 B2 | 11/2005 | Steinberg et al. | 714/47 |
| 6,966,057 B2 | 11/2005 | Lueh | 717/158 |
| 7,124,170 B1 | 10/2006 | Sibert | 709/216 |
| 7,127,709 B2 | 10/2006 | Demsey et al. | 717/148 |
| 7,174,544 B2 | 2/2007 | Zee | 717/148 |
| 2001/0002130 A1 | 5/2001 | Suzuoki | 345/420 |
| 2002/0046229 A1 | 4/2002 | Yutaka et al. | 709/102 |
| 2002/0060690 A1 | 5/2002 | Tanaka et al. | 345/619 |
| 2002/0095523 A1 | 7/2002 | Shimakawa et al. | 709/316 |
| 2002/0120886 A1 | 8/2002 | Nguyen et al. | 714/39 |
| 2002/0135582 A1 | 9/2002 | Suzuoki et al. | 345/502 |
| 2002/0138637 A1 | 9/2002 | Suzuoki et al. | 709/230 |
| 2002/0138701 A1 | 9/2002 | Suzuoki et al. | 711/154 |
| 2002/0138707 A1 | 9/2002 | Suzuoki et al. | 711/163 |
| 2002/0156993 A1 | 10/2002 | Suzuoki et al. | 712/30 |
| 2003/0009651 A1 | 1/2003 | Najam et al. | 712/34 |
| 2003/0055984 A1 | 3/2003 | Shimakawa et al. | 709/316 |
| 2003/0071840 A1 | 4/2003 | Huang et al. | 345/736 |
| 2003/0074650 A1* | 4/2003 | Akgul et al. | 717/129 |
| 2004/0123188 A1 | 6/2004 | Srinivasan et al. | 714/44 |
| 2004/0260685 A1 | 12/2004 | Pfleiger et al. | 707/3 |

FOREIGN PATENT DOCUMENTS

| | | |
|---|---|---|
| JP | 06-044110 | 2/1994 |
| JP | 08-095757 | 4/1996 |
| JP | 08-147171 | 6/1996 |
| JP | 10-269165 | 10/1998 |
| JP | 2002-342165 | 11/2002 |
| JP | 2002-366534 | 12/2002 |
| JP | 2003-140912 | 5/2003 |

OTHER PUBLICATIONS

Richard M. Stallman, Using and Porting the GNU Compiler Collection for GCC 3.1, Jun. 22, 2001, Published by the Free Software Foundation, pages 1-18, 75, and 269-275.

Microsoft Computer Dictionary, Fifth Edition, Microsoft, 2002, pages 49, 197, and 196.

* cited by examiner

SYSTEM AND METHOD FOR PROCESSOR THREAD FOR SOFTWARE DEBUGGING

BACKGROUND OF THE INVENTION

1. Technical Field

The present invention relates in general to a system and method for using a processor thread for software debugging. More particularly, the present invention relates to a system and method for initiating a debugger thread which invokes an operational thread whereby the debugger thread monitors the operational thread's functionality.

2. Description of the Related Art

Software code development proceeds through various stages before the code is released. A software developer writes the code, and then progresses through a series of code modifications using debug tools for detecting code errors.

A variety of debug tools are available for a software developer to use for debugging code. In many cases, a software developer uses a simulator to debug his code. A simulator is a software program that "simulates" the hardware that the code is targeted. The simulator loads the code, executes the code, and provides a user interface for a software developer to view the state of the code. However, a simulator typically does not execute the code "real-time" and, therefore, the simulator does not typically detect race conditions. A race condition is when two processes are running simultaneously and both are accessing a particular resource, such as a register.

One way for a software developer to detect race conditions is by loading his code on the targeted hardware. However, code in the development stages is typically unstable and is prone to crash a computer system. A challenge found, therefore, is debugging unstable code on its targeted hardware without seizing the hardware. A developer may spend more time rebooting his computer system than debugging his code. However, the only sure way that a developer knows how his code performs is by using the targeted hardware to execute the code. A challenge found, therefore, is using a code's targeted hardware to debug the code when the code in unstable.

What is needed, therefore, is a system and method for effectively debugging code using its targeted hardware and maintaining a robust environment.

SUMMARY

It has been discovered that the aforementioned challenges are resolved by initiating a debugger thread to invoke a operational thread whereby the operational thread executes code and the debugger thread monitors the operational thread during its code execution. When the operational thread crashes or terminates, the debugger thread retrieves operational data from the operational thread and provides the operational data to a software developer for analysis.

A processor invokes threads which are responsible for particular tasks. When the processor boots-up, the processor starts a debugger thread. The debugger thread loads its own operating system which is a stable operating system, such as Linux. The debugger operating system uses its own registers for storing and manipulating information.

Once the debugger thread is functioning, the debugger thread invokes an operational thread. The operational thread loads a primary operating system and may run application programs as well. For example, the primary operating system may be a new gaming operating system which runs particular graphic applications. Like the debugger thread, the operational thread has its own register set.

The software developer uses the debugger thread to monitor the performance and state of the operational thread. When the debugger thread detects that the operational thread has failed or is stuck in an infinite loop, the debugger thread notifies a software developer. Once notified, the software developer sends requests to the debugger thread to extract operational data from the operational thread to assist the software developer in the debugging process, such as register values, code line failure values, interrupts, and memory values. For example, the software developer may request the debugger thread to extract register values from the operational thread's registers and store the values in a storage location for the software developer to analyze.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
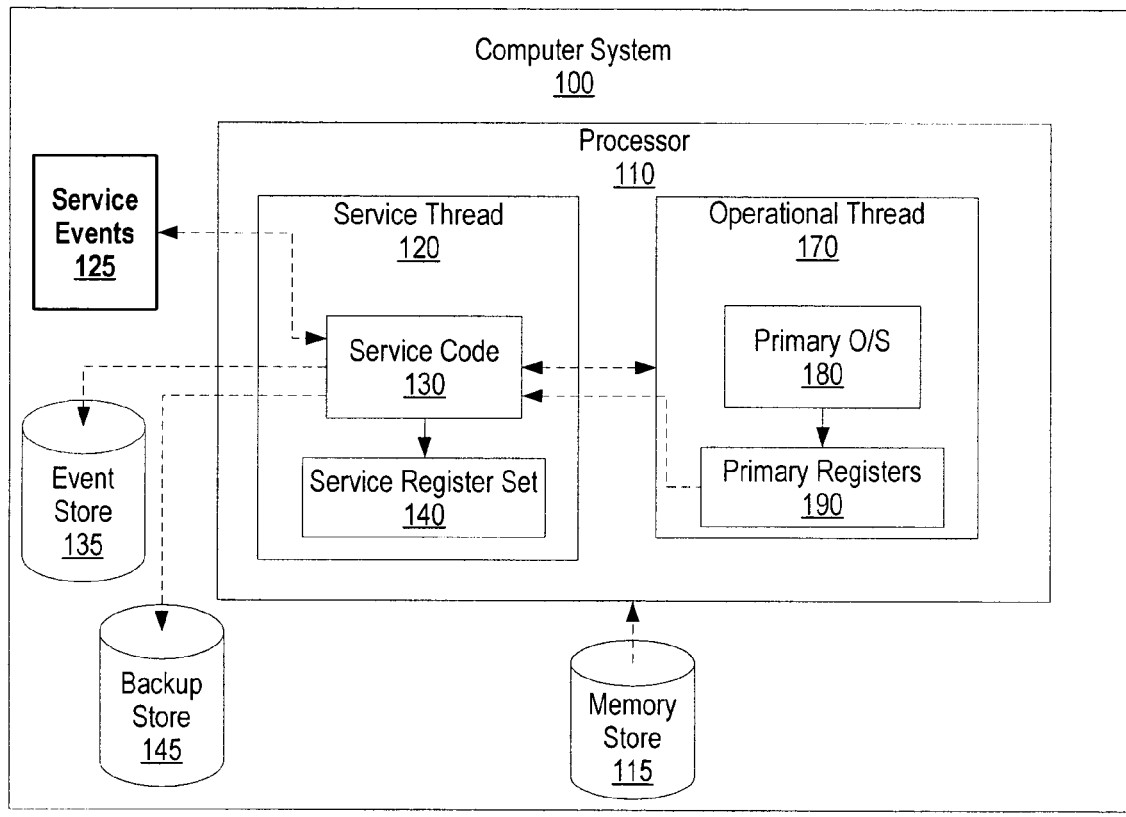
FIG. 1 is a diagram showing a first thread acting as a service processor and a second thread performing operational tasks.

FIG. 1 is a diagram showing a first thread acting as a service processor and a second thread performing operational tasks. Computer system 100 includes processor 110. Processor 110 invokes one or more threads which are responsible for particular tasks. The example shown in FIG. 1 shows service thread 120 performing service processor tasks and operational thread 170 performing operational tasks, such as executing an operating system.

When processor 110 boots-up, processor 110 starts service thread 120 which is responsible for performing tasks similar to what a service processor performs in a multi-processor architecture. For example, service thread 120 performs service checks on system events (e.g. service events 125) such as Error Checking and Correcting Memory (ECC) checks, hardware error log checks, heat sensor checks, and fan activity checks. Service thread 120 uses service code 130 to identify and monitor service events 125. Service thread 120 uses its own register set, such as service register set 140, during service thread 120's operation.

Once service thread 120 is functioning, service thread 120 invokes a second thread to perform operational tasks (e.g. operational thread 170), such as running an operating system and a kernel. Once invoked, operational thread 170 loads primary operating system 180 from memory store 115 and runs application programs that computer system 100 require. For example, operational thread 170 may run a gaming application using primary operating system 180. In this example, service thread 120 monitors system events 125 as well as operational thread 170 while operational thread 170 executes the gaming application. Memory store 115 may be stored on a nonvolatile storage area, such as a computer hard drive. Like service thread 120, operational thread 170 uses its own register set, such as primary registers 190.

During execution, service thread 120 receives service event values from service events 125 and stores them in event store 135. For example, service thread 120 may receive a temperature value from a heat sensor and store the value in event store 135. Event store 135 may be stored on a volatile or nonvolatile storage area, such as computer memory. When service thread 120 detects a service error with one of the service events, service thread 120 attempts to correct the problem by adjusting service tolerances (see FIG. 3 and corresponding text for further details service tolerance adjustments).

When service thread 120 detects that operational thread 170 is not functioning, service thread 120 backs up operational thread 170's data and/or properties and stores them in backup store 145. For example, service thread 120 may retrieve register values from primary registers 190 and store the values in backup store 145 for later analysis. For example, an operational thread that is not functioning may be reset whereby code at its entry point may be used to dump register information to a service thread (see FIG. 4 and corresponding text for further details regarding operational data analysis.

Figure 2:
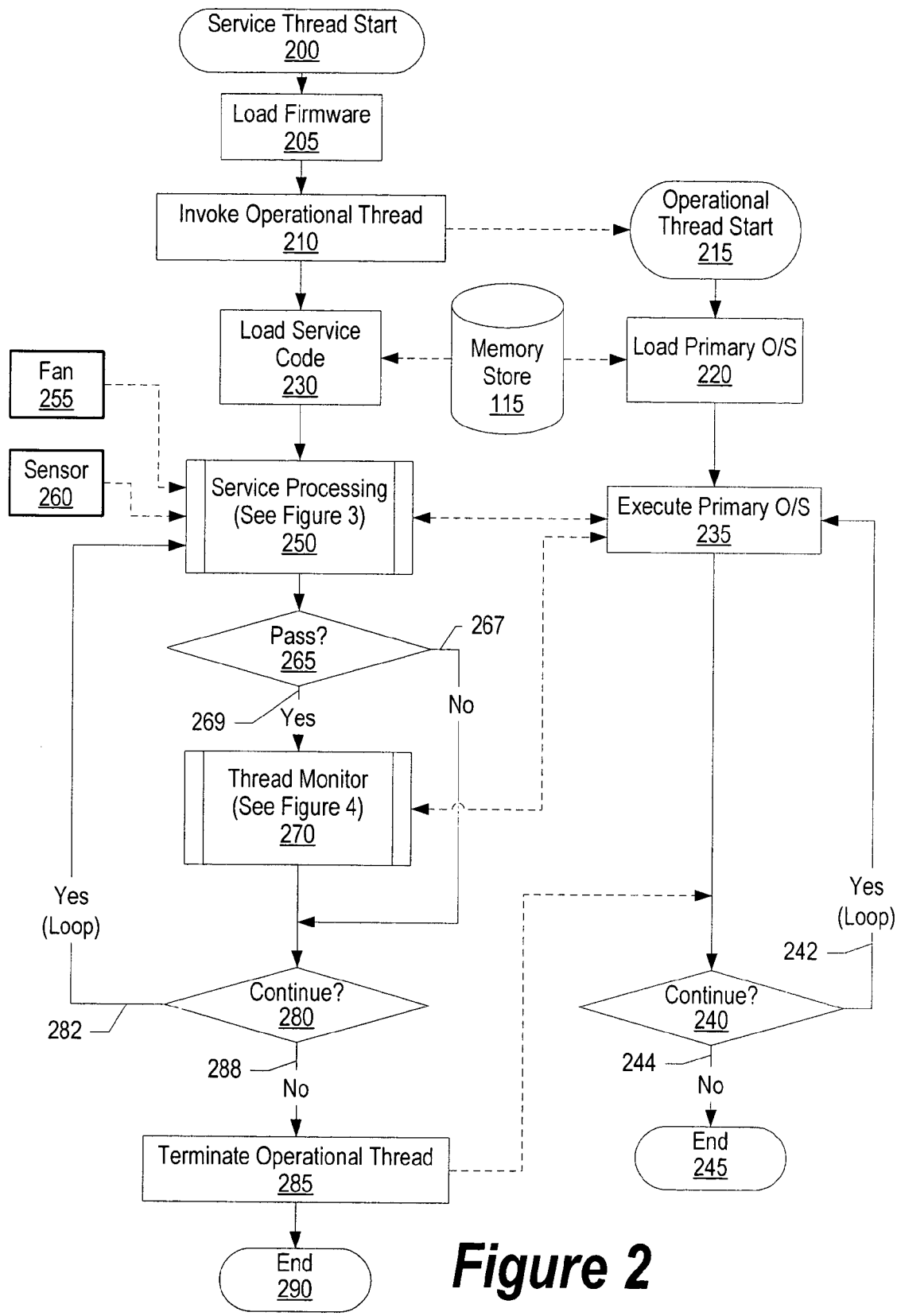
FIG. 2 is a service thread invoking an operational thread and monitoring service events.

FIG. 2 is a service thread invoking an operational thread and monitoring service events. A computer system boots up whereupon service thread processing commences at 200. The service thread loads firmware at step 205. In one embodiment, the service thread loads an operating system to assist in service event monitoring.

The service thread invokes the operational thread at step 210. The operational thread is a processing thread separate than the service thread, but executed on the same processor as the service thread. Operational thread processing commences at 215. The operational thread is responsible for running a primary operating system within the computer system, such as Linux. The operational thread loads an operating system from memory store 115 at step 220. Memory store 115 is the same as that shown in FIG. 1. The operational thread begins executing the primary operating system at step 235.

The service thread loads service code from memory store 115 at step 230. Service code includes code to check particular service events and also includes expected values of the service events. For example, one of the service events may be the proper operation of a fan. In this example, the service thread monitors the fan operation and validates that the fan is activated when a computer system reaches a particular temperature.

The service thread performs service checks to the computer system, such as checking service event values that correspond to fan 255 and sensor 260. Using the example described above, sensor 260 may provide a temperature reading that corresponds to the temperature of the computer system, and the service thread validates that the fan is active when the computer system reaches a particular temperature (pre-defined process bock 250, see FIG. 3 and corresponding text for further details).

A determination is made as to whether the computer system passes service checks (decision 265). For example, the service thread may log physical parameters (i.e. temperature, voltage, etc.) when an error occurs. In this example, over a period of time, a service thread may detect a correlation between one of the physical parameters and a system error in which the service thread identifies non-recoverable software errors in the OS and locate non-recoverable memory or cache errors. If the computer system passes service checks, decision 265 branches to "Yes" branch 269 whereupon the service thread monitors the operational thread's functionality (pre-defined process block 270, see FIG. 4 and corresponding text for further details). A determination is made as to whether to terminate operational thread processing (decision 280). For example, the service thread may detect a problem with a particular service event other operational thread itself. If the service thread should not terminate the operational thread, decision 280 branches to "Yes" branch 282 which loops back to continue service processing. This looping continues until the service thread should terminate the operational thread, at which point decision 280 branches to "No" branch 288 whereupon the service thread terminates the operational thread at step 285, and service thread processing ends at 290.

A determination is made as to whether the service thread wishes to terminate the operational thread (decision 240). If the operational thread should continue, decision 240 branches to "Yes" branch 242 which loops back to continue execution. This looping continues until the operational thread receives a termination request from the service thread, at which point decision 240 branches to "No" branch 244 whereupon operational thread processing ends at 245.

Figure 3:
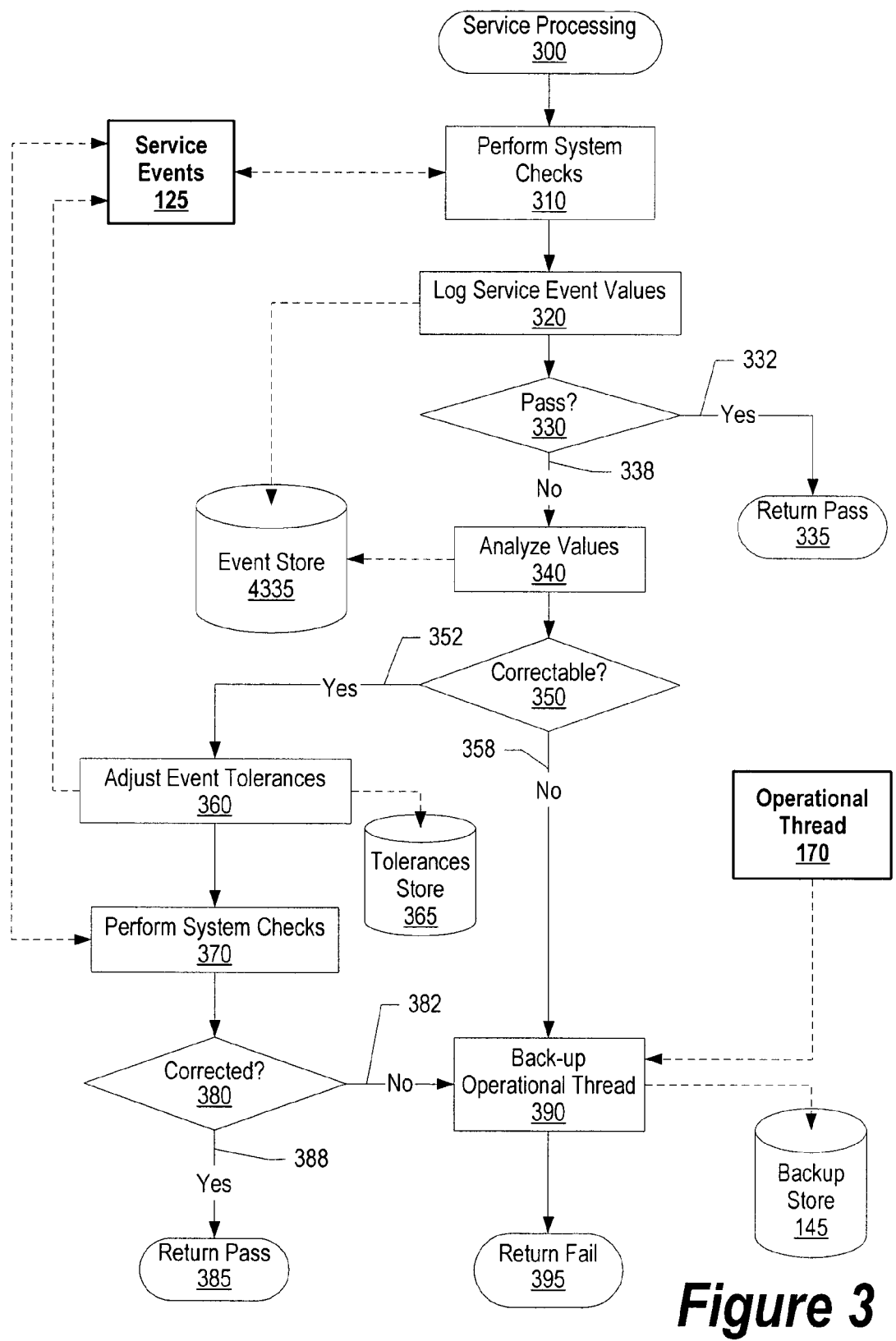
FIG. 3 is a flowchart showing steps taken in a service processor thread performing system checks on a computer system.

FIG. 3 is a flowchart showing steps taken in a service processor thread performing system checks on a computer system. Service thread processing commences at 300, whereupon the service thread performs system checks on service events 125 (step 310). Service events 125 is the same as that shown in FIG. 1 and includes events such as ECC error checks, hardware error log checks, heat sensor checks, and fan activation checks. For example, a service thread may use a polling loop to read registers at a fixed rate and receive interrupts for critical or non-recoverable errors.

Processing logs service event values that correspond to the service events in event store 135 (step 320). For example, the service thread may retrieve a temperature value from a heat sensor, and determine whether the fan should be active at the measured temperature. In this example, the service thread logs the temperature value and the state (i.e. on or off) of the fan. Event store 135 is the same as that shown in FIG. 1 and may be stored on a nonvolatile or volatile storage area, such as computer memory.

A determination is made as to whether service events 125 passed system checks (decision 330). Using the example described above, processing checks the fan's state to verify that the state is correct based upon the heat sensor value. If each of the system checks passes, decision 330 branches to "Yes" branch 332 whereupon processing returns a "Pass" value at 335.

On the other hand, if one of the system checks fails, decision 330 branches to "No" branch 338 whereupon processing analyzes the service event values stored in event store 135 (step 340). For example, if a fan was not turned on when it should have been at a particular temperature, processing may analyze a calibration factor that is used to translate a heat sensor's value to a particular temperature. In this example, the service processor may analyze the computational load of a processor to identify the amount of heat the processor should be producing. A determination is made as to whether the system event failure is correctable (decision 350). If processing determines that the system event failure is not correctable, decision 350 branches to "No" branch 358 whereupon the service processor backs up operational thread 170 and stores the operational data in backup store 145 (step 390). The backup data may include operational thread 170's register values and interrupt values. Operational thread 170 and backup store 145 are the same as that shown in FIG. 1. Processing returns a "Fail" at 395.

On the other hand, if the system event failure is correctable, decision 350 branches to "Yes" branch 352 whereupon processing adjusts event tolerances located in tolerances store 365 (step 360). Using the example described above, processing may increase a calibration factor corresponding to the heat sensor in order to activate the fan at a lower temperature.

Processing performs system checks on system events 125 with the adjusted event tolerances at step 370. A determination is made as to whether the adjusted event tolerances corrected the service event failure (decision 380). Using the example described above, processing determines whether the fan's activation in response to a heat value is correct. If the system checks pass, decision 380 branches to "Yes" branch 388 whereupon processing returns a "Pass" at 385. On the other hand, if processing determines that the event failure is not correctable, decision 380 branches to "No" branch 382 whereupon the service processor backs up operational thread 170 and stores the backup data in backup store 145 (step 390), and returns a "Fail" at 395.

Figure 4:
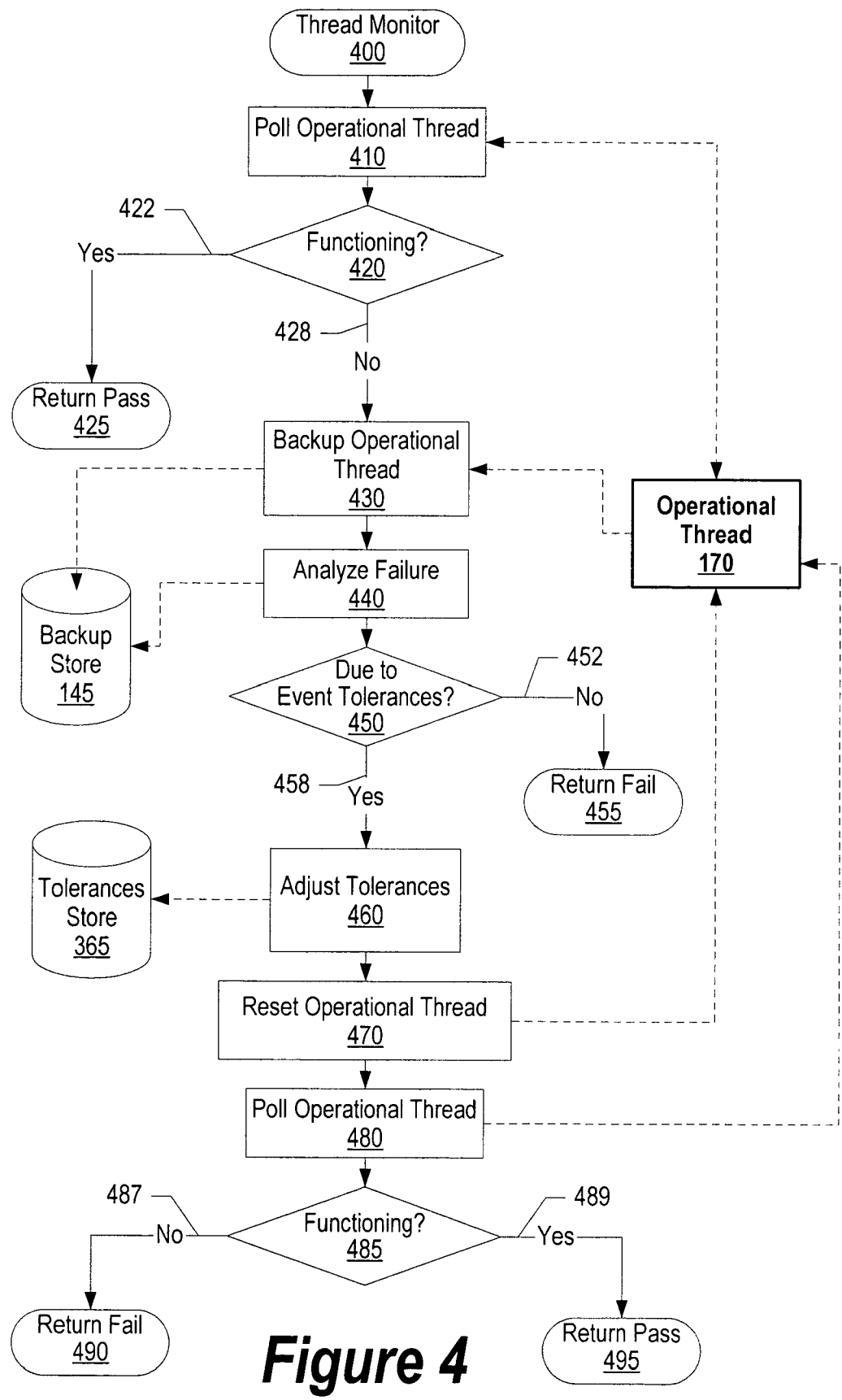
FIG. 4 is a flowchart showing steps taken in a service thread analyzing an operating system thread's functionality.

FIG. 4 is a flowchart showing steps taken in a service thread analyzing an operating system thread's functionality. Thread monitoring processing commences at 400, whereupon the service thread polls operational thread 170 at step 410. For example, the service thread uses shared memory to communicate with an operational thread and expects a response within a particular amount of time. A determination is made as to whether operational thread 170 is functioning. For example, operational thread 170 may have halted due to a particular interrupt value and is not responding to the service thread's polls. If operational thread 170 is functioning, decision 420 branches to "Yes" branch 422 whereupon processing returns a "Pass" at 425.

On the other hand, if operational thread 170 is not functioning, decision 420 branches to "No" branch 428 whereupon the service thread backs up operational thread 170 and stores the backed up data in backup store 145. The backup data may include operational thread 170's register values and/or interrupt values. Processing analyzes the failure at step 440 by identifying the failure mode and reviewing particular bits. For example, processing may receive register values corresponding to the operational thread whereby the service thread identifies a memory location of the occurring error and a corresponding instruction. In this example, the service thread examines the registers to determine if an uncorrectable memory error occurred and may deem the memory location has having an uncorrectable error when it is read.

A determination is made as to whether the failure mode was due to event tolerances (decision 450). For example, the service thread may log physical parameters (i.e. temperature, voltage, etc.) when an error occurs. In this example, over a period of time, a service thread may detect a correlation between one of the physical parameters and a system error in which the service thread identifies non-recoverable software errors in the OS and locate non-recoverable memory or cache errors. If processing determines that operational thread 170's failure is not due to event tolerances, decision 450 branches to "No" branch 452 whereupon processing returns a "Fail" at 455.

On the other hand, if operational thread 170 failed due to an event tolerance, decision 450 branches to "Yes" branch 458 whereupon processing adjusts event tolerances in event tolerances store 365 (step 460). Using the example described above, processing may adjust a temperature calibration value which turns on a computer system's fan at a lower temperature. Tolerances store 365 is the same as that shown in FIG. 3.

Processing resets operational thread 170 at step 470. Once reset, processing polls operational thread 170 at step 480. In one embodiment, processing waits a particular time before re-polling operational thread 170 in order for operational thread 170 to reach a particular area in code where operational thread 170 previously failed.

A determination is made as to whether operational thread 170 is functioning (decision 485). If operational thread is not functioning, decision 485 branches to "No" branch 487 whereupon processing returns a "Fail" at 490. On the other hand, if operational thread 170 is functioning, decision 485 branches to "Yes" branch 489 whereupon processing returns a "Pass" at 495.

Figure 5:
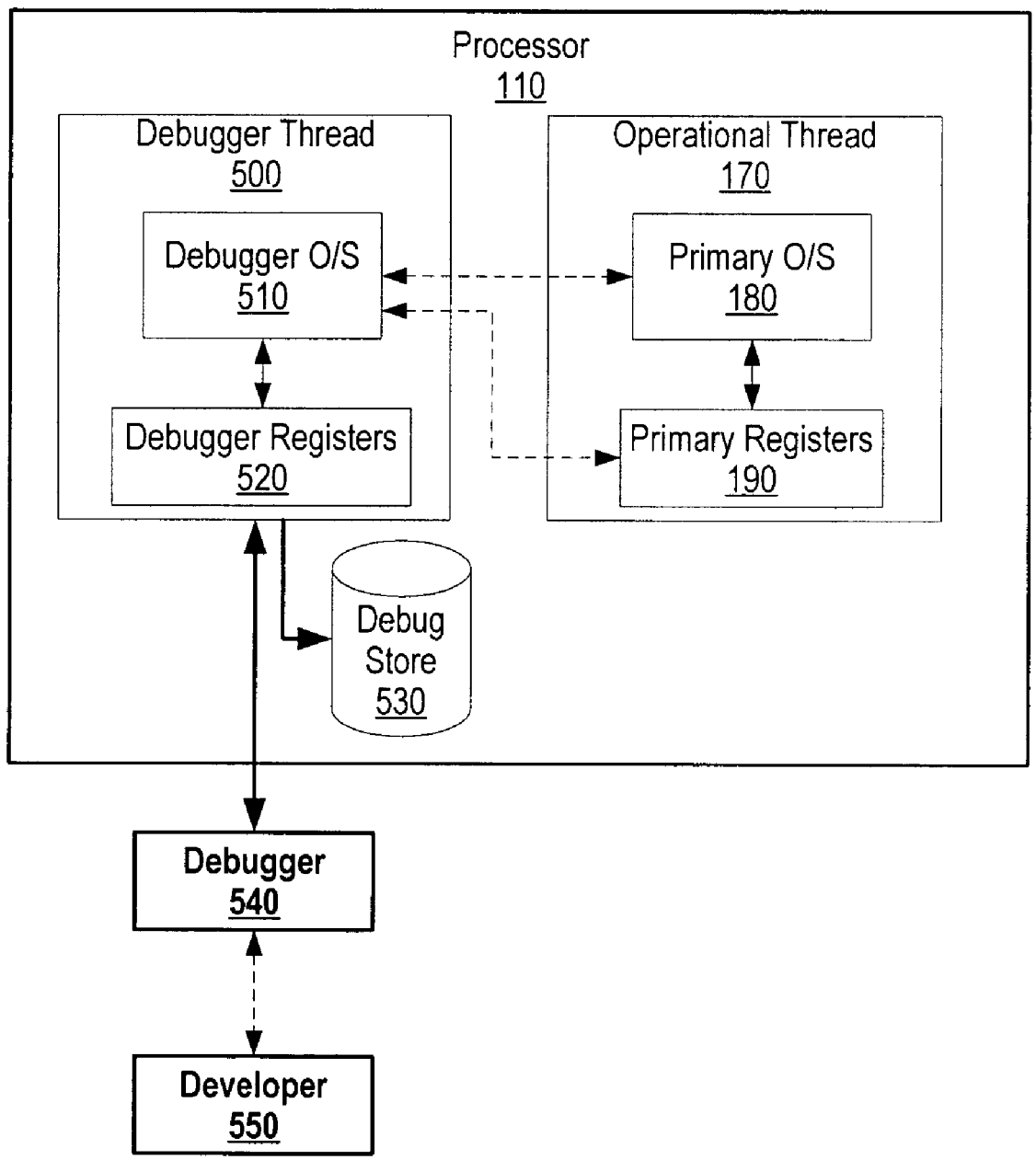
FIG. 5 is a diagram showing steps taken in a debugger thread monitoring an operational thread.

FIG. 5 is a diagram showing steps taken in a debugger thread monitoring an operational thread. Processor 110 invokes threads which are responsible for particular tasks. The example shown in FIG. 5 shows debugger thread 500 and operational thread 170 running on processor 110. Processor 110, operational thread 170, primary operating system 180, and primary registers 190 are the same as that shown in FIG. 1.

When processor 110 boots-up, processor 110 starts debugger thread 500. Developer 550 uses debugger thread 500 to debug code running on operational thread 170, such as primary operating system 180. For example, operational thread 170 may be executing a new, fragile operating system, such as an untested gaming operating system, and debugger thread 500 may be used to debug the gaming operating system when it fails. Debugger thread 500 loads its own operating system, such as debugger operating system 510. Debugger operating system 510 may be a more stable operating system than primary operating system 180 because developer 550 requires debugger thread 500 to be robust in order to debug operational thread 170. Debugger operating system 510 uses its own registers for storing and manipulating information, such as debugger registers 520.

Once debugger thread 500 is running, debugger thread 500 invokes a second thread (e.g. operational thread 170) to perform operational tasks, such as running an operating system and running a kernel. Once invoked, operational thread 170 loads primary operating system 180 and may run application programs as well. For example, primary operating system 180 may be a new gaming operating system which runs particular graphic applications. Like debugger thread 500, operational thread 170 has its own register set, such as primary registers 190.

Debugger thread 500 monitors the performance and state of operational thread 170. When debugger thread 500 detects that operational thread 170 has failed or is stuck in an infinite loop, debugger thread 500 notifies developer 550 through debugger API 540. Once notified, developer 550 sends requests to debugger thread to extract operational data from operational thread 170 to assist developer 550 in the debugging process, such as register values, code line failure values, interrupts, and memory values. For example, developer 550 may request debugger thread 500 to extract register values from primary registers 190 and store the values in debug store 530 for developer 550 to analyze (see FIG. 7 and corresponding text for further details regarding operational data analysis). Debug store 530 may be stored on a nonvolatile or volatile storage area, such as computer memory.

Figure 6:
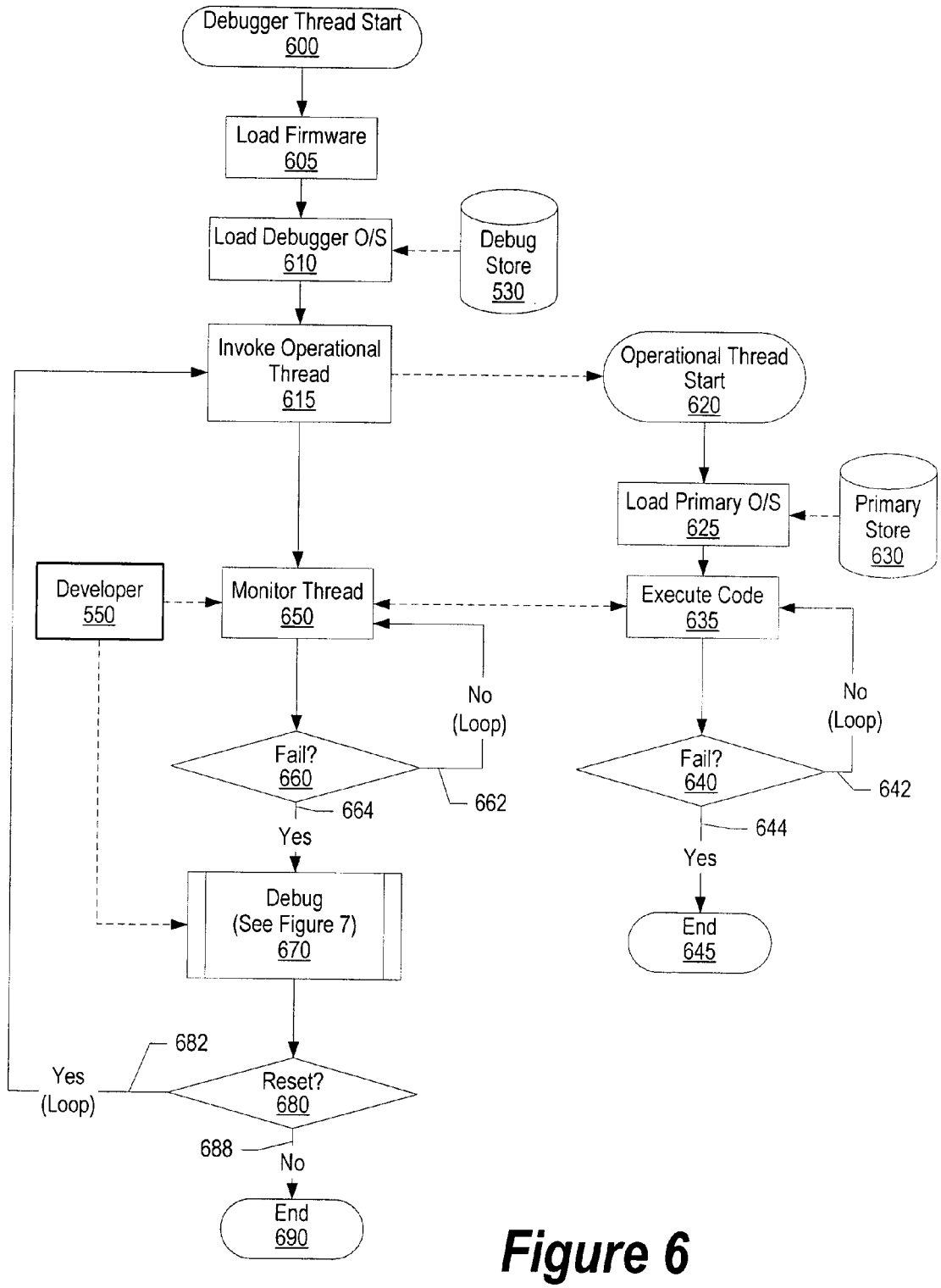
FIG. 6 is a flowchart showing steps taken in a debugger thread monitoring an operational thread.

FIG. 6 is a flowchart showing steps taken in a debugger thread monitoring an operational thread. Debugger thread processing commences at 600, whereupon processing loads firmware at step 605. Processing then loads an operating system for the debugger thread to use from debug store 530 (step 610). The operating system is typically a stable operating system, such as Linux, which allows the debugger thread to be robust during debugging activities. Debug store 530 is the same as that shown in FIG. 5.

The debugger thread invokes an operational thread at step 615, whereupon operational thread processing commences at 620. The operational thread loads its primary operating system from primary store 630 at step 625. The primary operating system is code that the debugger thread monitors and may not be as robust as the debugger threads operating system. For example, the primary operating system may be a new, untested, gaming operating system. Primary store 630 may be stored on a nonvolatile or volatile storage area, such as computer memory.

The operational thread executes the primary operating system code at step 635. A determination is made as to whether the primary operating system code has failed (decision 640). For example, the primary operating system may have ventured into an infinite loop. If the primary operating system has not failed, decision 640 branches to "No" branch 642 which loops back and continues to execute the primary operating system. This looping continues until the primary operating system fails, at which point decision 640 branches to "Yes" branch 644 whereupon operational thread processing ends at 645.

While the operational thread is executing the primary operating system, the debugger thread monitors the operational thread and may provide data to developer 550 (step 650). Developer 550 is the same as that shown in FIG. 5. A determination is made as to whether the operational thread failed (decision 660). If the operational thread did not fail, decision 660 branches to "No" branch 662 which loops back to continue to monitor the operational thread. This looping continues until the operational thread fails, at which point decision 660 branches to "Yes" branch 664 whereupon the debugger thread debugs the operational thread (pre-defined process block 670, see FIG. 7 and corresponding text for further details).

A determination is made as to whether to reset the operational thread (decision 680). For example, developer 655 may have fixed a code segment and wishes to re-run the operational thread. If the operational thread should be reset, decision 680 branches to "Yes" branch 682 which loops back to reset and monitor the operational thread. This looping continues until the debugger thread should not reset the operational thread, at which point decision 680 branches to "No" branch 688 whereupon debugger thread processing ends at 690.

Figure 7:
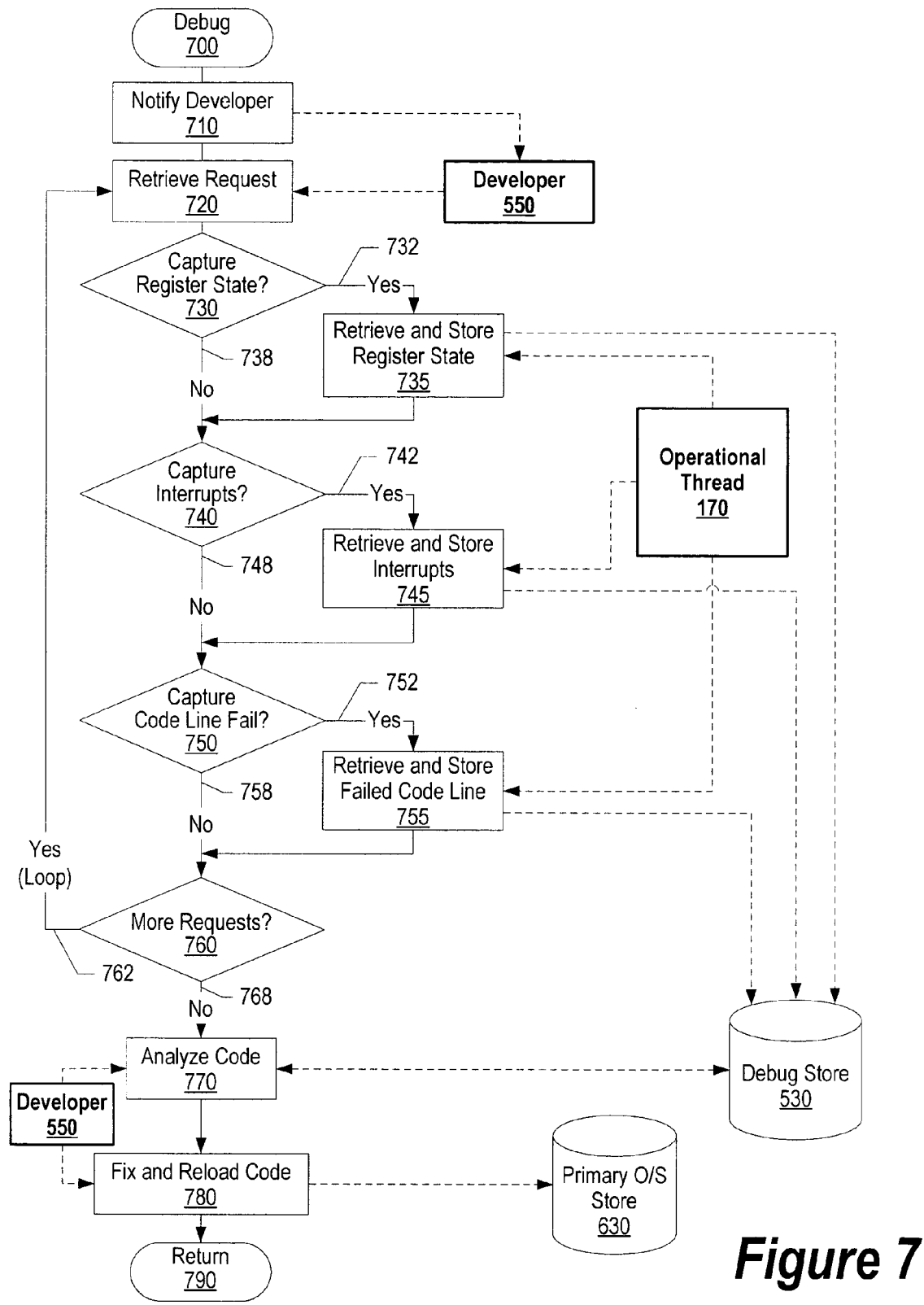
FIG. 7 is a flowchart showing steps taken in a debugger thread analyzing an operational thread's failure.

FIG. 7 is a flowchart showing steps taken in a debugger thread analyzing an operational thread's failure. Debugger thread processing commences at 700, whereupon the debugger thread notifies developer 550 of the operational thread failure (step 710). For example, the debugger thread may send a message to developer 550 that the operational thread failed. Developer 550 is the same as that shown in FIG. 5. The debugger thread receives a request from developer 550 at step 720.

A determination is made as to whether developer 550 wishes to capture the register state of operational thread 170 (decision 730). Operational thread 170 is the same as that shown in FIG. 1. If developer 550 wishes to capture the register state of operational thread 170, decision 730 branches to "Yes" branch 732 whereupon the debugger thread retrieves register values from operational thread 170 and stores the values in debug store 530. Debug store 530 is the same as that shown in FIG. 5. On the other hand, if developer 550 does not wish for the debugger thread to capture register values, decision 730 branches to "No" branch 738.

A determination is made as to whether developer 550 wishes to capture interrupts corresponding to operational thread 170 (decision 740). If developer 550 wishes to capture interrupts corresponding to operational thread 170, decision 740 branches to "Yes" branch 742 whereupon the debugger thread retrieves interrupt values from operational thread 170 and stores the values in debug store 530. On the other hand, if developer 550 does not wish for the debugger thread to capture interrupt values, decision 740 branches to "No" branch 748.

A determination is made as to whether developer 550 wishes to capture a failed code line corresponding to operational thread 170 (decision 750). For example, developer 550 may wish to identify the code line location at which the operational thread failed. If developer 550 wishes to capture a failed code line corresponding to operational thread 170, decision 750 branches to "Yes" branch 752 whereupon the debugger thread retrieves a failed code line value from operational thread 170 and stores the values in debug store 530. On the other hand, if developer 550 does not wish for the debugger thread to capture a failed code line, decision 750 branches to "No" branch 758.

A determination is made as to whether developer 550 wishes to acquire more operational data from operational thread 170 (decision 760). If developer 550 wishes to receive more requests, decision 760 branches to "Yes" branch 762 which loops back to receive and process more requests. This looping continues until developer 550 does not wish to send more requests, at which point decision 680 branches to "No" branch 768. Developer 550 analyzes operational data located in debug store 530 at step 770. After analysis, developer 550 fixes the code and reloads the code in primary operating system store 630 at step 780, and debugger thread processing returns at 790. Primary operating system store 630 is the same as that shown in FIG. 6. As one skilled in the art can appreciate, a debugger thread may perform other debug tasks besides what is shown in FIG. 7, such as stack back tracing and viewing memory locations corresponding to the operational thread.

Figure 8:
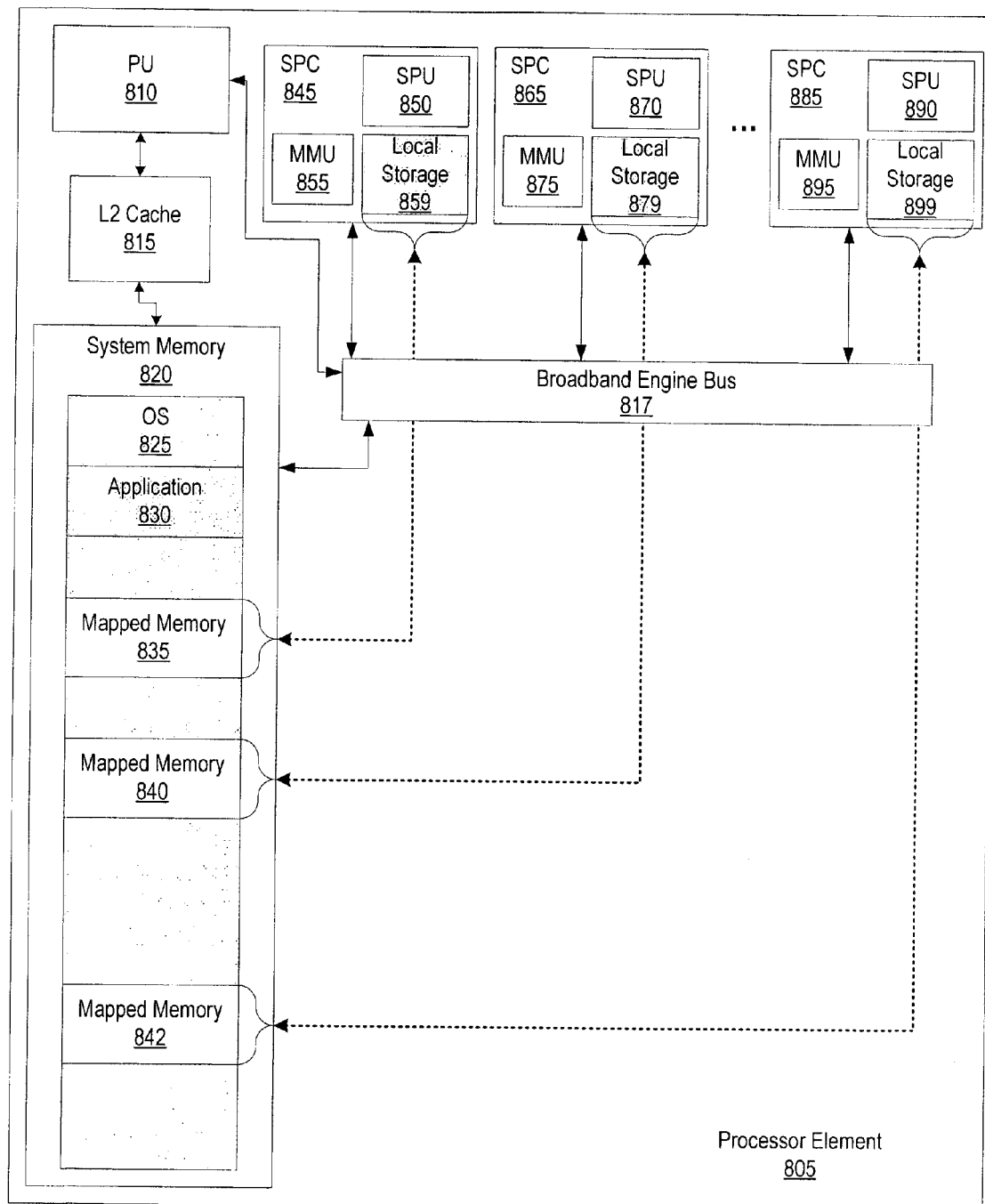
FIG. 8 is a block diagram illustrating a processing element having a main processor and a plurality of secondary processors sharing a system memory.

FIG. 8 is a block diagram illustrating a processing element having a main processor and a plurality of secondary processors sharing a system memory. Processor Element (PE) 805 includes processing unit (PU) 810, which, in one embodiment, acts as the main processor and runs an operating system. Processing unit 810 may be, for example, a Power PC core executing a Linux operating system. PE 805 also includes a plurality of synergistic processing complex's (SPCs) such as SPCs 845, 865, and 885. The SPCs include synergistic processing units (SPUs) that act as secondary processing units to PU 810, a memory storage unit, and local storage. For example, SPC 845 includes SPU 860, MMU 855, and local storage 859; SPC 865 includes SPU 870, MMU 875, and local storage 879; and SPC 885 includes SPU 890, MMU 895, and local storage 899.

Each SPC may be configured to perform a different task, and accordingly, in one embodiment, each SPC may be accessed using different instruction sets. If PE 805 is being used in a wireless communications system, for example, each SPC may be responsible for separate processing tasks, such as modulation, chip rate processing, encoding, network interfacing, etc. In another embodiment, the SPCs may have identical instruction sets and may be used in parallel with each other to perform operations benefiting from parallel processing.

PE 805 may also include level 2 cache, such as L2 cache 815, for the use of PU 810. In addition, PE 805 includes system memory 820, which is shared between PU 810 and the SPUs. System memory 820 may store, for example, an image of the running operating system (which may include the kernel), device drivers, I/O configuration, etc., executing applications, as well as other data. System memory 820 includes the local storage units of one or more of the SPCs, which are mapped to a region of system memory 820. For example, local storage 859 may be mapped to mapped region 835, local storage 879 may be mapped to mapped region 840, and local storage 899 may be mapped to mapped region 842. PU 810 and the SPCs communicate with each other and system memory 820 through bus 817 that is configured to pass data between these devices.

The MMUs are responsible for transferring data between an SPU's local store and the system memory. In one embodiment, an MMU includes a direct memory access (DMA) controller configured to perform this function. PU 810 may program the MMUs to control which memory regions are available to each of the MMUs. By changing the mapping available to each of the MMUs, the PU may control which SPU has access to which region of system memory 820. In this manner, the PU may, for example, designate regions of the system memory as private for the exclusive use of a particular SPU. In one embodiment, the SPUs' local stores may be accessed by PU 810 as well as by the other SPUs using the memory map. In one embodiment, PU 810 manages the memory map for the common system memory 820 for all the SPUs. The memory map table may include PU 810's L2 Cache 815, system memory 820, as well as the SPUs' shared local stores.

In one embodiment, the SPUs process data under the control of PU 810. The SPUs may be, for example, digital signal processing cores, microprocessor cores, micro controller cores, etc., or a combination of the above cores. Each one of the local stores is a storage area associated with a particular SPU. In one embodiment, each SPU can configure its local store as a private storage area, a shared storage area, or an SPU may configure its local store as a partly private and partly shared storage.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 810 and by the other SPUs. An SPU may reserve part of its local store in order for the SPU to have fast, guaranteed memory access when performing tasks that require such fast access. The SPU may also reserve some of its local store as private when processing sensitive data, as is the case, for example, when the SPU is performing encryption/decryption.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for debugging software code, said method comprising:
 initiating a debugger thread on a computer system, wherein the debugger thread performs a plurality of debugger events;
 invoking an operational thread on the computer system using the debugger thread, the operational thread performing operational tasks, wherein the invoking starts the operational thread for a first time;
 executing the software code using the operational thread;
 detecting whether the operational thread is functioning using the debugger thread; and debugging the operational thread using the debugger thread in response to the detecting.

2. The method as described in claim 1 further comprising:
receiving a request from a software developer;
retrieving operational data from the operational thread using the debugger thread in response to the request; and
providing the operational data to the developer.

3. The method as described in claim 2 wherein the operational data is selected from the group consisting of a register value, a code line failure value, an interrupt value, and a memory value.

4. The method as described in claim 2 wherein the operational data is one or more register values, and wherein the register locations are different from debugger register locations that are used by the debugger thread.

5. The method as described in claim 1 further comprising:
loading a debugger operating system on the debugger thread; and
loading a primary operating system on the operational thread, wherein the debugger operating system is different from the primary operating system.

6. The method as described in claim 1 wherein the computer system includes a plurality of dissimilar processors, wherein the operational thread and the debugger thread both execute on a common dissimilar processor from the plurality of dissimilar processors.

7. The method as described in claim 2 wherein the dissimilar processor is a processing unit.

8. An information handling system comprising:
a processor;
a memory accessible by the processor;
one or more nonvolatile storage devices accessible by the processor; and
a debugger thread tool for debugging an operational thread, the debugger thread tool comprising software code effective to:
initiate a debugger thread on a computer system, wherein the debugger thread performs a plurality of debugger events;
invoke an operational thread on the computer system using the debugger thread, the operational thread performing operational tasks, wherein the invoking starts the operational thread for a first time;
execute the software code using the operational thread;
detect whether the operational thread is functioning using the debugger thread; and
debug the operational thread using the debugger thread in response to the detecting.

9. The information handling system as described in claim 8 wherein the software code is further effective to:
receive a request from a software developer;
retrieve operational data from the operational thread using the debugger thread in response to the request; and
provide the operational data to the developer.

10. The information handling system as described in claim 9 wherein the operational data is selected from the group consisting of a register value, a code line failure value, an interrupt value, and a memory value.

11. The information handling system as described in claim 9 wherein the operational data is one or more register values, and wherein the register locations are different from debugger register locations that are used by the debugger thread.

12. The information handling system as described in claim 8 wherein the software code is further effective to:
load a debugger operating system on the debugger thread; and
load a primary operating system on the operational thread, wherein the debugger operating system is different from the primary operating system.

13. The information handling system as described in claim 8 wherein the computer system includes a plurality of dissimilar processors, wherein the operational thread and the debugger thread both execute on a common dissimilar processor from the plurality of dissimilar processors.

14. A computer program product stored on a computer operable media for debugging an operational thread using a debugger thread, said computer program product comprising:
means for initiating a debugger thread on a computer system, wherein the debugger thread performs a plurality of debugger events;
means for invoking an operational thread on the computer system using the debugger thread, the operational thread performing operational tasks, wherein the invoking starts the operational thread for a first time;
means for executing the software code using the operational thread;
means for detecting whether the operational thread is functioning using the debugger thread; and
means for debugging the operational thread using the debugger thread in response to the detecting.

15. The computer program product as described in claim 14 further comprising:
means for receiving a request from a software developer;
means for retrieving operational data from the operational thread using the debugger thread in response to the request; and
means for providing the operational data to the developer.

16. The computer program product as described in claim 15 wherein the operational data is selected from the group consisting of a register value, a code line failure value, an interrupt value, and a memory value.

17. The computer program product as described in claim 15 wherein the operational data is one or more register values, and wherein the register locations are different from debugger register locations that are used by the debugger thread.

18. The computer program product as described in claim 14 further comprising:
means for loading a debugger operating system on the debugger thread; and
means for loading a primary operating system on the operational thread, wherein the debugger operating system is different from the primary operating system.

19. The computer program product as described in claim 14 wherein the computer system includes a plurality of dissimilar processors, wherein the operational thread and the debugger thread both execute on a common dissimilar processor from the plurality of dissimilar processors.

20. The computer program product as described in claim 15 wherein the dissimilar processor is a processing unit.

* * * * *